(12) United States Patent
Brooks (10) Patent No.: US 8,280,638 B2
(45) Date of Patent: Oct. 2, 2012

(54) MULTI-STATION ANALYSIS OF MAGNETIC SURVEYS

(75) Inventor: Andrew G. Brooks, Tomball, TX (US)

(73) Assignee: Baker Hughes Incorporated, Houston, TX (US)

(*) Notice: Subject to any disclaimer, the term of this patent is extended or adjusted under 35 U.S.C. 154(b) by 329 days.

(21) Appl. No.: 12/388,652

(22) Filed: Feb. 19, 2009

(65) Prior Publication Data

US 2010/0211318 A1 Aug. 19, 2010

(51) Int. Cl.
*G01V 3/18* (2006.01)
*G01C 17/16* (2006.01)

(52) U.S. Cl. ............... 702/9; 702/6; 702/151; 73/152.46

(58) Field of Classification Search .................. 702/9, 6, 702/151; 73/152.46
See application file for complete search history.

(56) References Cited

U.S. PATENT DOCUMENTS

| | | | | |
|---|---|---|---|---|
| 4,163,324 A * | 8/1979 | Russell et al. | .................. | 33/313 |
| 4,761,889 A * | 8/1988 | Cobern et al. | .................. | 33/302 |
| 4,956,921 A | 9/1990 | Coles | | |
| 5,321,893 A * | 6/1994 | Engebretson | .................. | 33/304 |
| 5,435,069 A | 7/1995 | Nicholson | | |
| 5,452,518 A | 9/1995 | DiPersio | | |
| 5,623,407 A | 4/1997 | Brooks | | |
| 6,179,067 B1 * | 1/2001 | Brooks | .......................... | 175/45 |
| 6,883,240 B2 * | 4/2005 | Russell et al. | .................. | 33/313 |
| 7,038,458 B1 * | 5/2006 | Wiegert | .................... | 324/345 |
| 7,503,403 B2 * | 3/2009 | Jogi et al. | ......................... | 175/45 |
| 2006/0066295 A1 * | 3/2006 | Tamura et al. | ................. | 324/202 |
| 2006/0106587 A1 * | 5/2006 | Rodney | ........................... | 703/10 |
| 2007/0203651 A1 * | 8/2007 | Blanz et al. | ....................... | 702/6 |
| 2008/0042870 A1 * | 2/2008 | Orban et al. | .............. | 340/854.2 |

FOREIGN PATENT DOCUMENTS

| | | | |
|---|---|---|---|
| CA | 02597829 | * | 2/2008 |
| GB | 2301438 | * | 4/1996 |
| GB | 2301438 A | | 12/1996 |
| WO | 9821448 A1 | | 5/1998 |

OTHER PUBLICATIONS

D. Halliday, R. Resnick, and J. Walker, Fundamentals of Physics—6th ed., 2001, p. 758.*
R. Sognnes et al.; "Improving MWD Survey Accuracy in Deviated Wells by Use of a New Triaxial Magnetic Azimuth Correction Method," SPWLA 37th Annual Logging Symposium, Jun. 16-19, 1996, Paper HHH, pp. 1-14.
E. Nyrnes et al.; "Detection of Gross Errors in Wellbore Directional Surveying for Petroleum Production with Emphasis on Reliability Analyses," Kart OG Plan, vol. 65, Feb. 2005, pp. 98-116.

(Continued)

*Primary Examiner* — Hal Wachsman
*Assistant Examiner* — Regis Betsch
(74) *Attorney, Agent, or Firm* — Mossman Kumar & Tyler PC (57) ABSTRACT

A multi-station gravity and magnetic survey is carried out in a borehole. The data from the survey are processed to estimate the inclination and azimuth of the borehole. The drill collar relative permeability is estimated, and the estimated drill collar permeability is then used to remove the effects of induced magnetization of the drill collar on the magnetic measurements.

16 Claims, 5 Drawing Sheets

OTHER PUBLICATIONS

A. C. Scott et al.; "Determining Downhole Magnetic Interference on Directional Surveys," SPE 7748, Middle East Oil Technical Conference of the Society of Petroleum Engineers, Manama, Bahrain, Mar. 25-29, 1979, pp. 5-10.

E. Nyrnes et al.; "Error Properties of Magnetic Directional Surveying Data," SPWLA 46th Annual Logging Symposium, Jun. 26-29, 2005, pp. 1-16.

R. Ekseth et al.; "High Integrity Wellbore Surveys; Methods for Eliminating Gross Errors," SPE/IADC 105558, 2007 SPE/IADC Drilling Conference, Amsterdam, The Netherlands, Feb. 29-22, 2007, pp. 1-17.

E. Nyrnes et al.; "Analyses of the Accuracy and Reliability of Magnetic Directional Surveys," SPE/IADC 96211, SPE/IADC Middle East Drilling Technology Conference & Exhibition, Dubai, U.A.E., Sep. 12-14, 2005, pp. 1-20.

C. R. Chia et al.; "MWD Survey Accuracy Improvements Using Multistation Analysis," IADC/SPE 87977, IADC/SPE Asia Pacific Drilling Technology Conference and Exhibition, Kuala Lumpur, Malaysia, Sep. 13-15, 2004, pp. 1-7.

E. Nyrnes; "Minimum Requirements for Multi-Station Analyses," 26th meeting of the SPE WPTS, Nov. 15, 2007, Anaheim, CA, 5 pages.

A. G. Brooks et al.; "Practical Application of a Multiple-Survey Magnetic Correction Algorithm," SPE 49060, 1998 SPE Annual Technical Conference and Exhibition, New Orleans, Louisiana, Sep. 27-30, 1998, pp. 379-386.

* cited by examiner

MULTI-STATION ANALYSIS OF MAGNETIC SURVEYS

BACKGROUND OF THE DISCLOSURE

1. Field of the Disclosure

The present disclosure is directed towards the surveying of wellbore orientation, including correcting magnetometer measurements for the effect of magnetization of the drill collar.

2. Background of the Disclosure

Surveying of boreholes is commonly performed by the use of instruments containing sets of three orthogonal accelerometers and magnetometers, which are inserted within the drillstring and used to measure the orientations of the local gravitational and magnetic field vectors. In order to measure the earth's magnetic field, which is used as a north reference from which wellbore azimuth may be computed, the instrument is placed within a section of a non-magnetic material extending between upper and lower ferromagnetic drillstring sections. These ferromagnetic portions of the drillstring tend to acquire remanent magnetization as they are repeatedly strained in the earth's magnetic field during transportation and drilling operations. The nominally non-magnetic portion of the drillstring may also acquire some lesser remanent magnetization as a result of imperfections. The result is that magnetometer measurements made by an instrument within a drillstring may measure not the undisturbed magnetic field, but the vector sum of the earth's field and an error field caused by remanent drillstring magnetization. Since the tool is fixed with respect to the drillstring, the error field is fixed with respect to the tool's coordinate system and it appears as bias errors on the magnetometer measurements, which can lead to errors in the determination of wellbore azimuth and trajectory unless measures are taken to compensate for these bias errors. Drilling fluid may contain magnetic particles such as steel filings from casing. The presence of such particles will impart magnetic permeability to the fluid, such that it attenuates the cross-axial field seen by the magnetometers. Such attenuation appears to be a scale factor error on the transversely sensitive magnetometers. In addition, ferromagnetic drill collars will develop an induced axial flux proportional to the axial component of the earth's field. At the ends of the ferromagnetic collars, the flux produces magnetic poles which affect the axially sensitive magnetometer. Since the effect is proportional to the axial component of the earth's field, it appears to be a scale factor error on the axially sensitive magnetometer. These apparent scale factor errors can also lead to errors in the determination of wellbore azimuth and trajectory unless compensatory measures are taken.

Estimation of magnetometer bias is often done for surveys at single stations. The single-station corrections normally assume that the error field is parallel to the drillstring; therefore sufficient information is available if the total magnetic field and/or dip angle can be provided from an independent source, such as a global geomagnetic model or a local reference measurement. Single-station corrections of this type suffer from inaccuracy in certain attitudes, and they do not normally correct for magnetic disturbances which are not parallel to the drillstring. More recently, multi-station magnetic corrections have been developed. These techniques may increase the range of attitudes in which corrections can be applied, and they can also identify some off-axis magnetic anomalies, while providing improved quality control. An axiom of multi-station corrections is the assumption that magnetic disturbances are unchanged over each group of survey stations being processed. See, for example, U.S. Pat. No. 6,179,067 to Brooks having the same assignee as the present disclosure, which is incorporated herein by reference in its entirety.

While the assumption that magnetic disturbances are unchanged over a group of survey stations is not unreasonable in the case of remanent collar magnetization or attenuation of the cross-axial field by drilling mud, it is known that the effect of the induced component of drill collar magnetization will change depending on the angle between the collar and the earth's field. In order to correct for induced magnetization accurately, it must therefore be modeled as an axial scale factor error rather than as a bias. However, the solution of the multi-station problem tends to be very poorly conditioned if a solution is sought for both an axial bias and an axial scale factor, because these two parameters are closely correlated. Therefore it has become common practice to ignore the axial scale factor error and to solve multi-station problems for axial bias only. Such multi-station solutions are inaccurate, because they fail to account for the variation in axial error field between stations which results from induced magnetization or axial scale factor error.

SUMMARY OF THE DISCLOSURE

One embodiment of the disclosure is a method of surveying a borehole during drilling operations. The method includes obtaining magnetic and gravitational measurements at a plurality of locations in the borehole; and using the magnetic and gravitational measurements at the plurality of locations to estimate an inclination and an azimuth of the borehole at at least one of the plurality of locations, the estimation correcting at least in part for a scale factor error in the magnetic measurements due to a magnetization of a drill collar.

Another embodiment of the disclosure is an apparatus configured to survey a borehole during drilling operations. The apparatus includes at least one magnetometer configured to obtain magnetic measurements at a plurality of locations in the borehole; at least one accelerometer configured to obtain gravitational measurements at the plurality of locations in the borehole; and at least one processor configured to estimate from the plurality of magnetic and gravitational measurements an inclination and an azimuth of the borehole at at least one of the plurality of locations, the estimation correcting at least in part for a scale factor error in the magnetic measurements due to a magnetization of the drill collar.

Another embodiment of the disclosure is a computer-readable medium accessible to at least one processor, the computer-readable medium including instructions which enable the at least one processor to estimate an axial bias in magnetic measurements made by a magnetometer in a borehole at a plurality of depths using magnetic measurements made by the magnetometer; use the estimated axial bias in the magnetic measurements and accelerometer measurements to estimate an inclination and azimuth of the borehole.

BRIEF DESCRIPTION OF THE DRAWINGS

The disclosure herein will best be understood when read in conjunction with the accompanying drawings, wherein.

DETAILED DESCRIPTION OF THE DISCLOSURE

Figure 1:
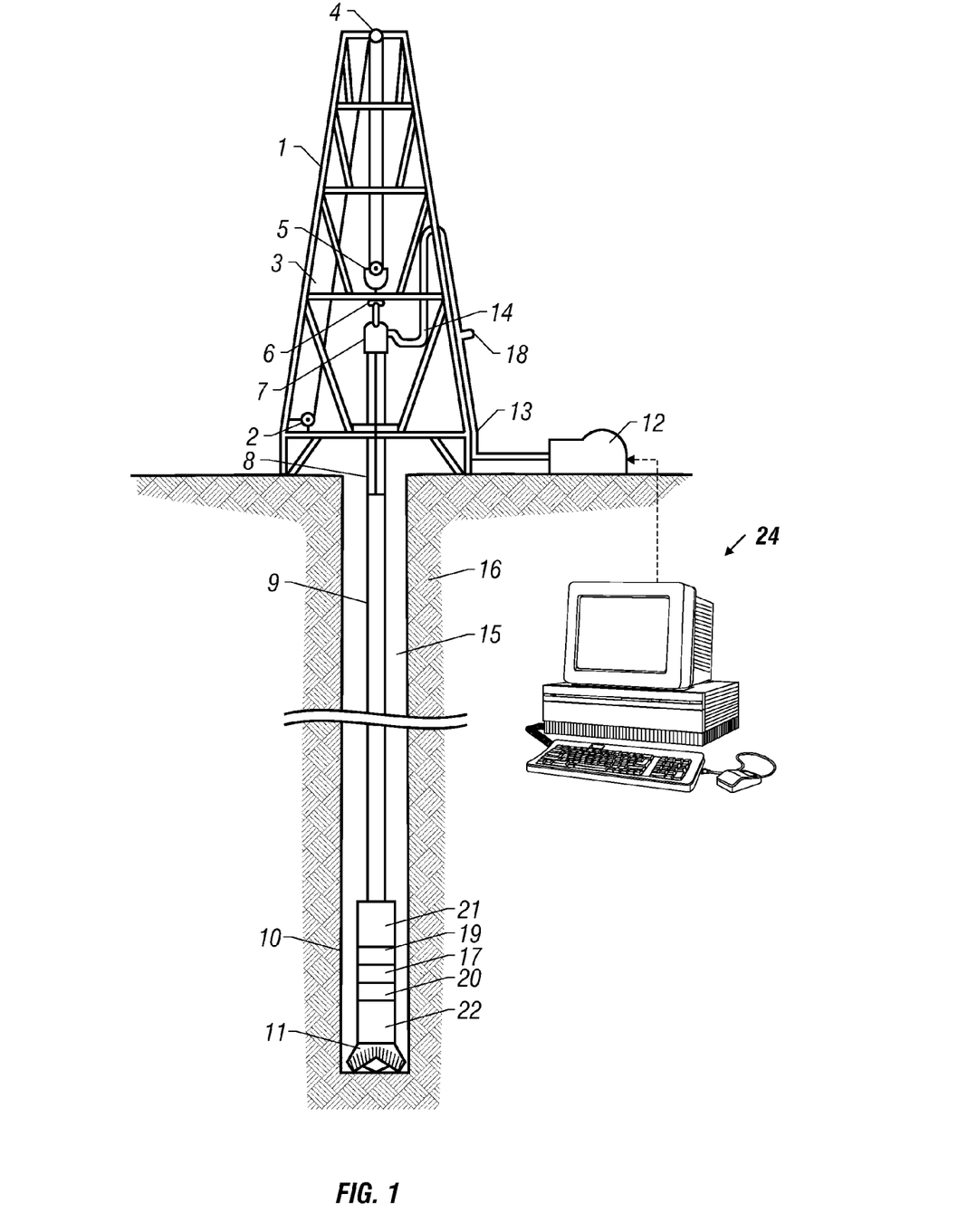
FIG. 1 shows a drilling system comprising a drilling rig, a survey instrument and a fluid circulating system, according to one embodiment of the disclosure.

FIG. 1 illustrates a rig engaged in drilling operations; the equipment includes a derrick 1, drawworks 2, cable 3, crown block 4, traveling block 5, and hook 6, supporting a drillstring which includes a swivel joint 7, kelly 8, drill pipe 9, drill collars 10, and drill bit 11. Pumps 12 circulate drilling fluid through a standpipe 13 and flexible hose 14, down through the hollow drillstring and back to the surface through the annular space 15 between the drillstring and the borehole wall 16. During the course of drilling a borehole for oil or gas exploration, it is advantageous to measure from time to time the orientation of the borehole in order to determine its trajectory. This may be accomplished by the use of a survey tool 17 located within the drill collars 10, for measuring the direction and magnitude of the local gravitational and magnetic fields with respect to a tool-fixed coordinate system. A survey may be taken each time the drilling operation is interrupted to add a new section to the drillstring; however, surveys may be taken at any time.

Still referring to FIG. 1, the measured data may be transmitted to the surface by modulating a valve (not shown) placed in the flow passage within or adjacent to survey tool 17, causing pressure pulses to propagate in the mud column up the drillstring, where they are detected by a pressure transducer 18 placed in the standpipe 13 and communicated to data processing system 24 which may be located on the rig floor or in a logging trailer or other work area, which may be approximately programmed to: (1) to interpret the pressure pulses; (2) eliminate the influence of magnetic field error components; and (3) calculate one or more conventional wellbore orientation indicators. Data processing system 24 may be programmed in accordance with the present disclosure. Other methods and devices for communicating data uphole, such as electromagnetic methods or acoustic signals in the drillstring, and wired drill pipe may also be used and such and other methods are intended to be within the scope of the disclosure herein.

The borehole inclination, in one aspect, may be determined by the use of the gravitational measurements alone, while the borehole azimuth is determined from the gravitational and magnetic measurements; since the azimuth uses the direction of the local magnetic field as a north reference, the survey tool 17 may be placed in non-magnetic portions 19 and 20 of the drillstring situated between upper and lower ferromagnetic sections 21 and 22. Remanent magnetization of the upper and lower ferromagnetic sections 21 and 22, as well as imperfections in the non-magnetic materials comprising the survey tool 17 and the non-magnetic collars 19 and 20 may produce a magnetic error field, which is fixed in the tool's frame of reference and which therefore appears as bias errors affecting the magnetic measurements. Magnetic particles in the drilling fluid may cause an attenuation of the transverse component of the earth's field, which appears as transverse scale factor errors. Induced magnetization of the ferromagnetic drill collars causes an axial error field, which appears as an axial scale factor error. The present disclosure, in one aspect, is directed to determining these axial scale factor errors in order to compensate for their presence and thus to provide more accurate measurements of the borehole azimuth.

Figure 2:
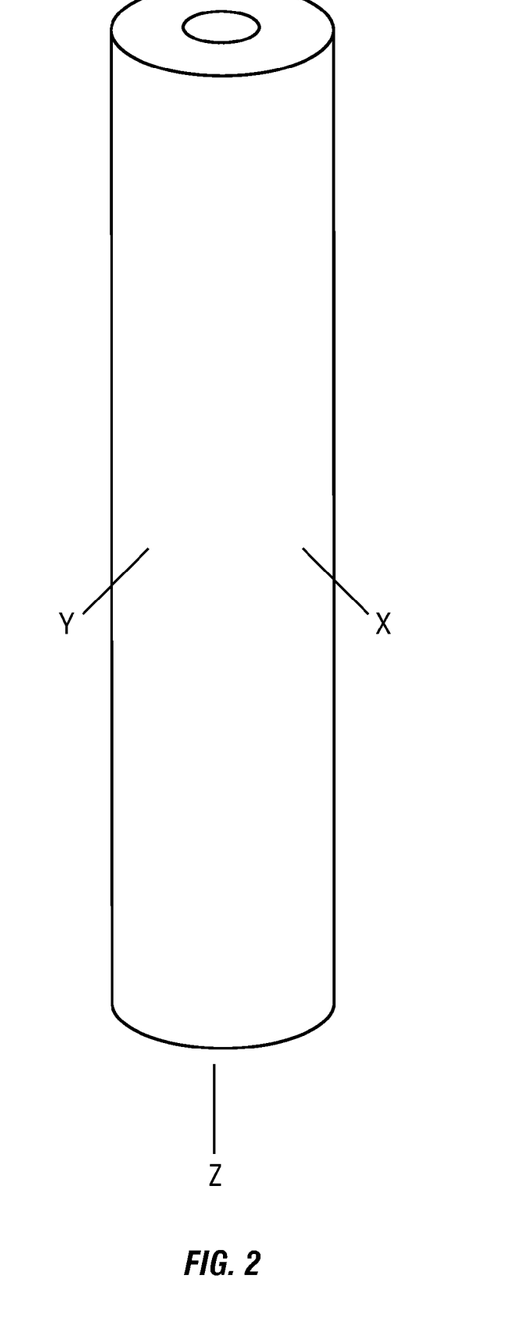
FIG. 2 shows a tool-fixed coordinate system used by a magnetic survey instrument located within a drillstring, according to one aspect of the disclosure.

The disclosure will first be described as it pertains to solving for constant bias errors along each axis. For the purpose of this disclosure, the tool-fixed coordinates are designated as x, y and z coordinates, the z-coordinate being aligned with the drillstring axis and the x- and y-coordinates being orthogonal to each other and the z axis, as illustrated in FIG. 2. The survey tool 17 measures three components $G_x$, $G_y$, and $G_z$ of the gravitational vector G, and three components $B_x$, $B_y$ and $B_z$ of the magnetic flux density vector B.

The principal sources of azimuth uncertainty in magnetic surveys are sensor errors, uncertainty in the magnetic declination, instrument misalignment, and drilling magnetization. The overall uncertainty at a bottomhole location tends to be dominated by the declination and magnetization errors, since such uncertainties tend to be systematic over a group of surveys. Arrays of accelerometers and magnetometers respectively measure the direction of the gravity and magnetic field vectors with respect to the tools x-y-z coordinate frame. The azimuth may then be computed as $$A = \tan^{-1}\frac{(G_x^2 + G_y^2 + G_z^2)^{0.5}(B_yG_x - B_xG_y)}{B_z(G_x^2 + G_y^2) - G_z(B_xG_x + B_yG_y)}. \quad (1)$$

Accelerometer and magnetometer sensor errors G and B cause the measurements to be imprecise. The consequent uncertainties in azimuth caused by bias errors may be estimated as $$\delta A_g = \varepsilon_g\left[\left(\frac{\partial A}{\partial G_x}\right)^2 + \left(\frac{\partial A}{\partial G_y}\right)^2 + \left(\frac{\partial A}{\partial G_z}\right)^2\right] \quad (2)$$

$$= \frac{180}{\pi}\frac{\varepsilon_g}{G}\left[\frac{B_y^2}{B_h^2} + \frac{1}{\tan^2 I} - \frac{B_v\cos A}{B_h\tan I}\right]^{0.5},$$

$$\delta Ab = \varepsilon_b\left[\left(\frac{\partial A}{\partial B_x}\right)^2 + \left(\frac{\partial A}{\partial B_y}\right)^2 + \left(\frac{\partial A}{\partial B_z}\right)^2\right] = \frac{180}{\pi}\frac{\varepsilon_b}{B_h}, \quad (3)$$

where $B_h$ and $B_v$ are the horizontal and vertical components of the local magnetic flux density, and I is the inclination.

The accelerometer and magnetometer errors are uncorrelated. Thus, the overall azimuth uncertainty due to sensor errors is $$\delta A = (\delta A_g^2 + \delta A_b^2) \quad (4)$$

Incorrect declination values are a primary source of azimuth error in magnetic surveys. One method of avoiding large declination errors is a site survey and in-field referencing to provide local magnetic field parameters in real time.

Another source of errors in survey tools is misalignment of the tool's axis (z-coordinate) with the borehole. Such azimuth errors, however, are usually small in comparison with the other errors and their effect tends to be randomized as the toolface angle changes between surveys.

The total error in the magnetic measurements arises from at least two quantities. One source of error arises from the fact that as ferromagnetic drillstring materials are rotated and stressed in the earth's magnetic field, they may develop remanent magnetization. Some components may be magnetized further during inspection and transportation. Magnetic poles are produced close to the ends of each ferromagnetic member of the drillstring, although some components may also develop intermediate poles. Each pole produces an error field at the sensor proportional to its pole strength and inversely proportional to the square of its distance from the sensor. The error field seen by the sensor is assumed to be the sum of the contributions from all the poles.

Since ferromagnetic drillstring components are normally spaced at least several meters axially from the sensors, the error fields due to remanent magnetization tend to be closely aligned with the z-axis. The error field therefore appears equivalent to a bias error on the z-magnetometer. A cross-axial bias effect may also be present as a result of off-axis magnetic poles, drillstring bending, or hot spots in nonmagnetic collars, but the cross-axial effect is typically an order of magnitude smaller than axial.

Ferromagnetic drillstring components may exhibit both remanent and induced magnetization. The error field due to induced magnetization is caused by magnetic poles where the flux enters or leaves the more permeable materials; it is proportional to the magnitude of the external field and therefore it appears similar to a magnetometer scale factor error. Induced axial magnetization associated with drillstring components is usually small in comparison with the remanent component, and its effect may sometimes be masked by downhole changes in remanent magnetization over a period of time. The error field due to induced magnetization is dependent on the axial component of the external field, and therefore it is not constant along a curved wellpath. Magnetic particles in drilling fluid can cause the transverse components of the external field to be attenuated. Their effect can be modeled as scale factor errors on the transverse magnetometers.

Conventional single-station magnetic corrections process each survey independently, by assuming the error field to be aligned with the z-axis. The unknown z-component of the flux density leaves a single degree of freedom between the components of the local field.

Figure 3:
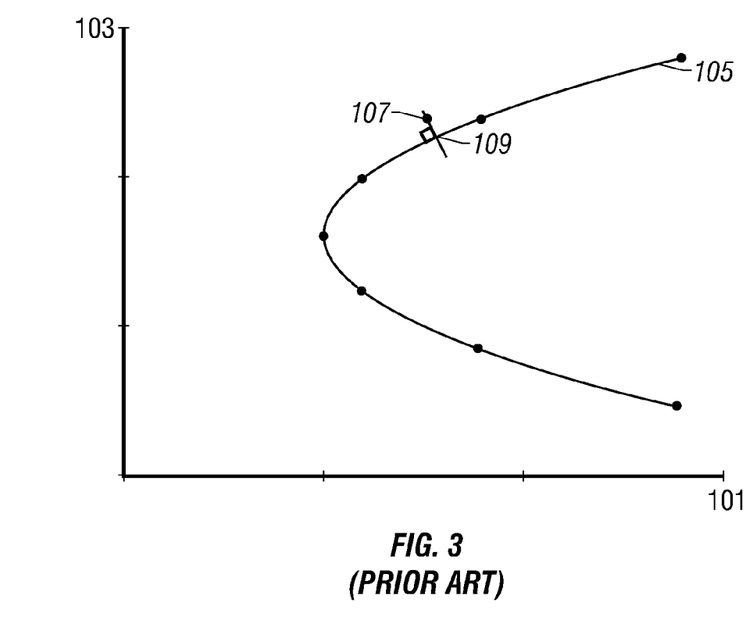
FIG. 3 shows the application of methods for the correction of axial bias errors based upon external field measurements that may be utilized for the purposes of this disclosure.

A method is illustrated schematically in FIG. 3. The abscissa 101 is the horizontal component of the magnetic field and the ordinate 103 is the vertical component of the magnetic field. Different points along the curve 105 correspond to different biases in the z-component of the magnetic measurement and corresponding values of the apparent azimuth of the tool. The equations relating the magnetometer measurements to the magnetic field components are:

$$G_{meas} = (G_{xmeas}^2 + G_{ymeas}^2 + G_{zmeas}^2)^{1/2}$$

$$B_{meas} = (B_{xmeas}^2 + B_{ymeas}^2 + B_{zmeas}^2)^{1/2}$$

$$B_{vmeas} = \frac{(B_{xmeas}G_{xmeas} + B_{ymeas}G_{ymeas} + B_{zmeas}G_{zmeas})}{G_{meas}}$$

$$Bhmeas = (B_{meas}^2 - B_{vmeas}^2)^{1/2}$$

The point 107 represents an externally supplied reference field measurement. Methods for obtaining such reference measurements are discussed below. In the above described method, the solution is taken as the point 109 on the curve which minimizes the vector distance to the externally-supplied reference field. This point is obtained by dropping a perpendicular from 107 to the curve 105.

A problem with the corrections of this type is that their accuracy degrades in horizontal boreholes having an east-west orientation. These attitudes are, unfortunately, those in which the drillstring magnetization effects tend to reach a maximum.

The present disclosure and the disclosure of Brooks, in one aspect, use data from a number of surveys and assume that error components are common to all surveys. Based on this assumption, the variance among apparent local field values is minimized. For example, if a common axial magnetic error component is estimated as a bias Ebz, the z-magnetometer measurement of the n-th survey can be corrected by $$Bz_{corr_n} = Bz_{meas_n} - \epsilon_{bz} \tag{5}$$

The vertical and horizontal components of the local magnetic flux density can then be computed by $$Bv_n = \frac{(Bx_n Gx_n + By_n Gy_n + Bz_{corr_n} Gz_n)}{(Gx_n^2 + Gy_n^2 + Gz_n^2)}, \tag{6}$$

$$Bh_n = (Bx_n^2 + By_n^2 + Bz_{corr_n}^2 - Bv_n^2)^{0.5}. \tag{7}$$

where $BV_n$ and $Bh_n$ are measurements that have been corrected and transformed from the tool coordinate system (x,y,z) to horizontal and vertical coordinates h and v, i.e., an earth-referenced coordinate system. The variance in the corrected transformed measurements over N surveys with respect to reference vertical and horizontal measurements $BV_{ref}$ and $Bh_{ref}$ is thus $$V = \frac{1}{N-1} \sum_{n=1}^{N} [(Bh_n - Bh_{ref})^2 + (Bv_n - Bv_{ref})^2]. \tag{8}$$

Instead of horizontal and vertical reference data, the reference data may be in any other set of coordinates. Such variations are intended to be within the scope of the disclosure.

Figure 4:
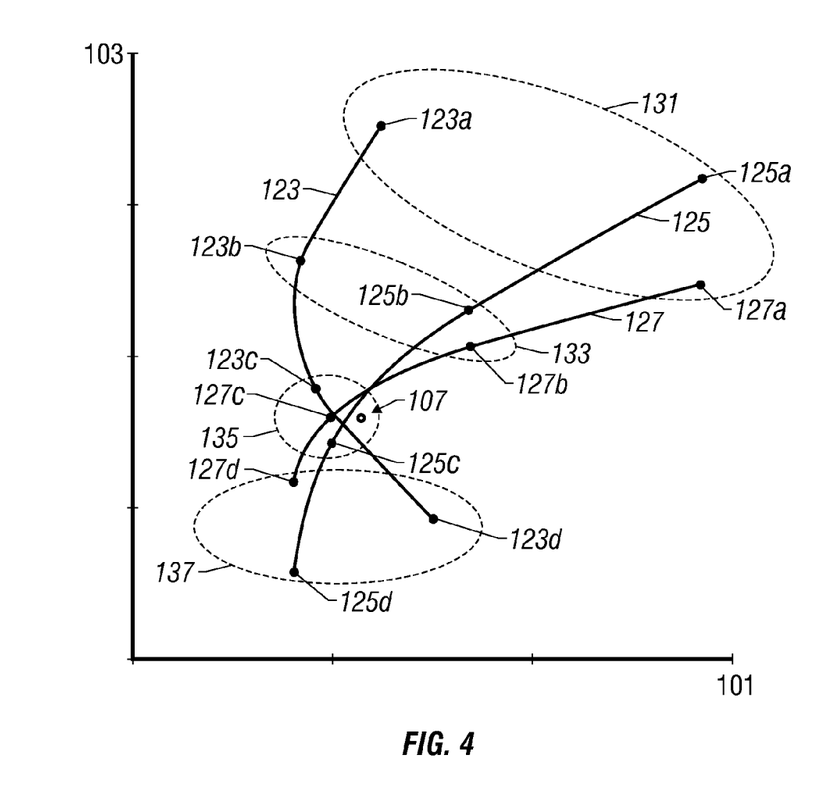
FIG. 4 shows the application of the present disclosure for correction of errors in multiple surveys.

A method of using multiple surveys is illustrated in FIG. 4, where three surveys are shown, depicted by 123, 125 and 127. The raw data are indicated by the points 123a, 125a and 127a. The data corresponding to one trial value of the z-magnetometer bias $\epsilon_{bz}$ are denoted by 123b, 125b and 127b, Correction with a second trial value of the z-magnetometer bias $\epsilon_{bz}$ are denoted by 123c, 125c and 127c while correction with a third trial value of the magnetometer bias gives the points 123d, 125d and 127d. In this example, the points are grouped most closely about the reference value 107 and the variance is minimized by using trial value 3 (corresponding to zone 135). A bias value close to this is selected as the optimum and the surveys are corrected accordingly.

The assumption of constant disturbance over each group of survey stations is not unreasonable when the source of the disturbance is remanent magnetization of the drill collar, or magnetic particles in the drilling mud. However, the induced component of drill-collar magnetization will change depending upon the angle between the drill collar and the earth's magnetic field. It is theoretically possible for a multi-station correction algorithm to separate the remanent and induced components of magnetization, which appear as axial bias and scale factor errors respectively. However, to do so reliably generally requires a very large variation in attitude which is rarely achieved downhole. The present disclosure addresses the problem of estimating the apparent axial scale factor error due to the induced drill collar magnetization.

Figure 5:
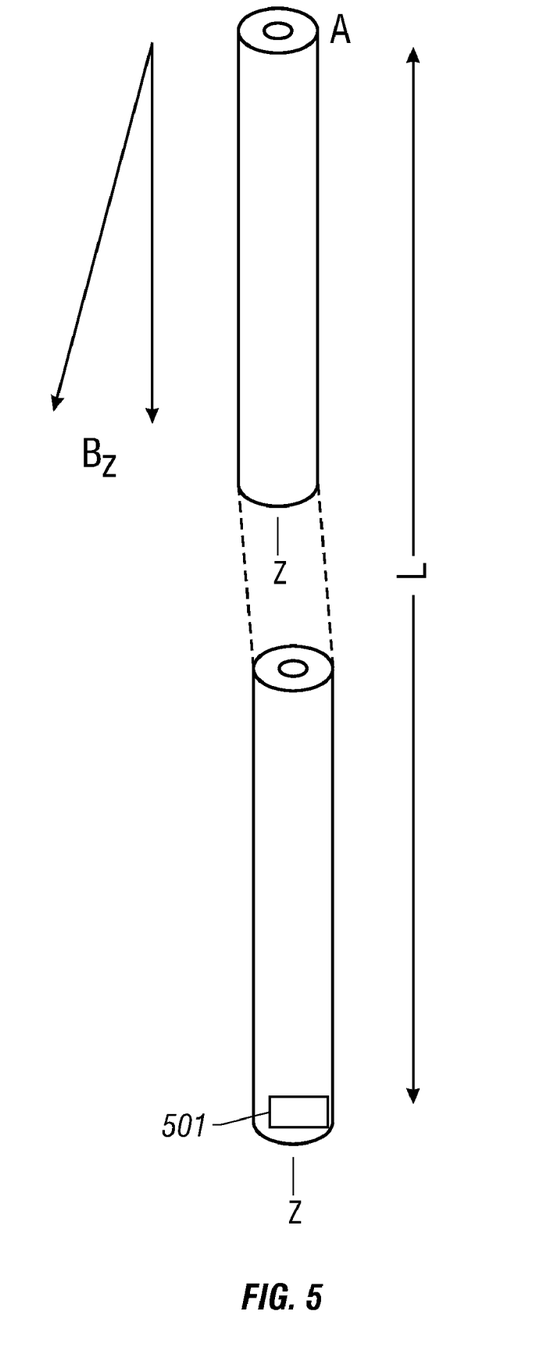
FIG. 5 illustrates the effect of induced magnetization of a drill collar on magnetometer.

The induced component of the magnetic pole at the end of a drill collar is the axial magnetic flux density in the collar multiplied by the cross-section area of the collar. This can be expressed as:

$$P = B_z \mu_R A \tag{9}$$

where $B_z$ is the axial component of the geomagnetic flux density $B_z$, $\mu_r$ is the relative magnetic permeability of the collar, and A is the cross-section area of the collar. See FIG. 5. The influence of this pole on a magnetometer 501 at an axial distance L is:

$$\varepsilon B_z = \frac{P}{4\pi L^2}. \quad (10)$$

Combining eqns. (9)-(10) gives $$\varepsilon B_z = \frac{B_z \mu_r A}{4\pi L^2}. \quad (11)$$

The induced magnetization therefore appears as an axial error field which is proportional to the external axial flux density. It is therefore equivalent to an axial scale factor error $S_z$, with a value $$S_z = \frac{\varepsilon B_z}{B_z} = \frac{\mu_r A}{4\pi L^2}. \quad (12)$$

When several magnetic poles need to be taken into consideration, their various equivalent scale factor errors can be summed, taking care to apply the correct signs. It is clear that the spacing L of the magnetic material from the magnetometer and the collar cross-section A are known quantities. The only unknown is the relative magnetic permeability $\mu_r$, which is a function of the drill collar material. This is expected to be similar for most magnetic drill collars, with a value in the region of 100, but this can be confirmed with either single-station or multi-station analysis of actual field data from wells which show a large variation in $B_z$.

Figure 6:
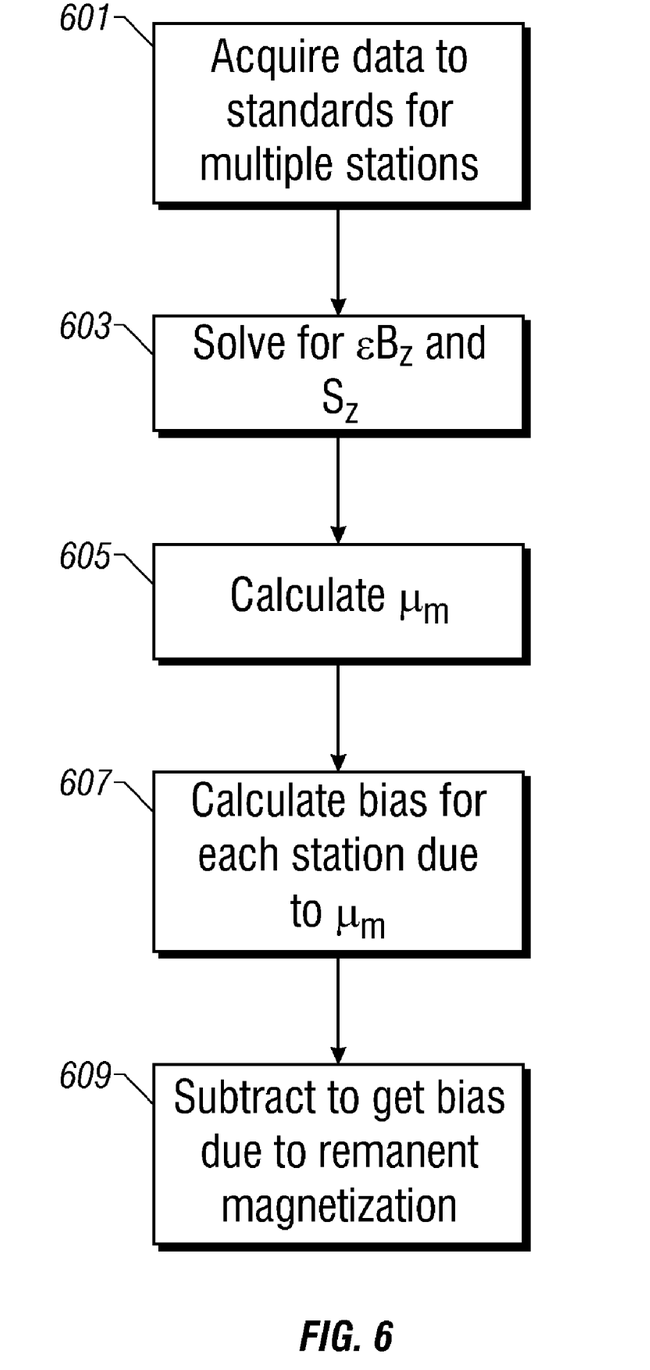
FIG. 6 shows a flow chart illustrating some of the principles of the present disclosure.

To estimate $\mu_r$, the following procedure illustrated in FIG. 6 may be used. Data for a multi-station survey are acquired 601. In one embodiment of the disclosure, the data meet the requirements spelt out in Erik Nymes' presentation to the SPE Wellbore Positioning Technical Section, Nov. 15, 2007, published at www.iscwsa.org, and submitted in an accompanying Information Disclosure Statement. There is a wide range in values of the axial flux density $B_z$; the range may exceed one half of the total geomagnetic flux density. The data are analyzed using a multi-station analysis method such as that discussed above 603. The estimated scale factor $S_z$ for the survey is then used to estimate $\mu_m$ using the relation:

$$\mu_m = 4 \cdot \pi \cdot S_z \cdot \sum_{i=1}^{N} \frac{L_i^2}{A_i}, \quad (13)$$

where N is the number of collar poles considered in the analysis and $L_i$ is the distance from the i-th pole to the magnetometer. Thus, the effect of the drill collar is modeled by at least one magnetic pole for each of a plurality of ferromagnetic drill collar segments.

As an example, the method was applied to field data in a plurality of multi-station survey and gave an estimated value of $\mu_m$ of 107 with a standard deviation of 52. No negative values were obtained. This compares with an expected value of about 100 for most ferromagnetic drill collars.

Once the magnetic permeability $\mu m$ has been estimated, the contribution to the magnetic bias for each station due to induced magnetization can be calculated 607 by use of eqn (11). and subtracted 609 from the total bias at each station estimated at 603 to leave only the contribution to the magnetic bias at each station due to remanent magnetization. The estimate of magnetic permeability can be applied to any ferromagnetic drill collar of similar material. The contribution due to induced magnetization is removed and the multi-station analysis described above is then performed using the corrected measurements, solving for axial bias but not for axial scale factor error. It should be noted that the axial scale factor error may also be estimated from analysis of the data from individual stations of the multi-station survey when there is a large variation in axial magnetic field strength among surveys taken with a common BHA. This may happen in a borehole with a large variation in inclination or azimuth. Single-station analysis will determine an apparent axial bias error and a corrected axial field strength at each station. Plotting the apparent bias error versus the corrected axial field strength resolves the data into components of bias (the intercept at zero axial field strength) and apparent scale factor error (the slope of the plot). Eqn. (13) may then be used to estimate the magnetic permeability of the drill collars.

The improved estimate of the bias and scale factors results in more accurate estimation of borehole position. This is very useful in reservoir navigation where directional wells are drilled with the objective of penetrating a specific formation at a specific location.

The processing of the magnetometer and other survey data may be accomplished by the downhole processor and/or the surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The results of the processing include telemetry signal estimates relating to measurements made by downhole formation evaluation sensors. Such results are commonly stored on a suitable medium and may be used for further actions in reservoir development such as the completion of wells and the drilling of additional wells.

The present disclosure is illustrated by way of the foregoing description, and various modifications will be apparent to those skilled in the art. It is intended that all such variations be within the scope and spirit of the appended claims.

What is claimed is:

1. A method of surveying a borehole during drilling operations, comprising:
    using at least one sensor for obtaining magnetic and gravitational measurements at a plurality of locations in the borehole, the magnetic measurements including a scale factor error due to a drill collar comprising a plurality of drill collar segments; and
    using at least one processor to estimate, from (i) a magnetic permeability of the drill collar and (ii) the magnetic and gravitational measurements at the plurality of locations, an inclination and an azimuth of the borehole at at least one of the plurality of locations, the estimation being based on a modeling of each of the drill collar segments using at least one magnetic pole of each of the plurality of drill collar segments and correcting at least in part for the scale factor error.

2. The method of claim 1 wherein the estimated magnetic permeability is obtained using at least one of: (i) a table look up, (ii) direct measurement using a permeability meter, or (iii) analysis of individual magnetic measurements made in one or more boreholes.

3. The method of claim 1 wherein estimating the magnetic permeability further comprises modeling the at least one magnetic pole of each of the plurality of drill collar segments as having a strength proportional to an axial component of a geomagnetic field.

4. The method of claim 1 further comprising performing further drilling operations using the estimated inclination and azimuth of the borehole at the least one location of the borehole.

5. The method of claim 1 further comprising conveying the at least one sensor on a bottomhole assembly on a drilling tubular.

6. The method of claim 1 wherein at least one sensor further comprises a 3-component magnetometer and a 3-component accelerometer.

7. The method of claim 1 wherein the modeling includes using individual distances between the at least one sensor and each of the drill collar segments.

8. The method of claim 1, wherein the modeling estimates the magnetic permeability using the equation:

$$\mu_m = 4 \cdot \pi \cdot S_z \cdot \sum_{i=1}^{N} \frac{L_i^2}{A_i}$$

where $\mu_m$ the estimated magnetic permeability of the drill collar, $S_z$ is the scale factor, N is a number of magnetic poles, i is a pole reference number, L is the distance of the i-th pole to the at least one sensor, an A is a cross-sectional area of a drill collar segment.

9. An apparatus configured to survey a borehole during drilling operations, the apparatus comprising:
    at least one magnetometer configured to obtain magnetic measurements at a plurality of locations in the borehole, the magnetic measurements including a scale factor error due to a magnetization of a drill collar comprising a plurality of drill collar segments;
    at least one accelerometer configured to obtain gravitational measurements at the plurality of locations in the borehole; and
    at least one processor configured to estimate from (i) a magnetic permeability of the drill collar and (ii) the plurality of magnetic and gravitational measurements an inclination and an azimuth of the borehole at at least one of the plurality of locations, the estimation being based on a modeling of each of the drill collar segments using at least one magnetic pole of each of the plurality of drill collar segments and correcting at least in part for the scale factor error.

10. The apparatus of claim 9 wherein the at least one processor is further configured to estimate the scale factor error by using at least one of: (i) a table look up, (ii) direct measurement using a permeability meter, and (iii) analysis of individual magnetic measurements made in the borehole; wherein locations corresponding to the individual measurements have considerable variation in a magnetic field strength.

11. The apparatus of claim 9 wherein the at least one processor is further configured to use the estimated magnetic permeability for estimating an effect on each of the plurality of magnetic measurements by an induced magnetization of the drill collar.

12. The apparatus of claim 9 wherein the at least one processor is further configured to control further drilling operations using the estimate of the inclination and azimuth of the borehole at the at least one location.

13. The apparatus of claim 9 further comprising a bottomhole assembly configured to convey the at least one magnetometer and the at least one accelerometer, and a drilling tubular configured to convey the bottomhole assembly into the borehole.

14. The apparatus of claim 9 wherein the at least one magnetometer further comprises a three-component magnetometer and the at least one accelerometer further comprises a three-component accelerometer.

15. A non-transitory computer-readable medium product having instructions thereon that, when read by at least one processor, cause the at least one processor to perform a method, the method comprising:
    estimating a scale factor error in magnetic measurements made by a magnetometer in a borehole at a plurality of depths using magnetic measurements made by the magnetometer and an estimated permeability of a drill collar comprising a plurality of drill collar segments and a modeling of each of the drill collar segments using at least one magnetic pole of each of the plurality of drill collar segments; and
    using the estimated scale factor error in the magnetic measurements and accelerometer measurements for estimating an inclination and azimuth of the borehole.

16. The non-transitory computer-readable medium product of claim 15 further comprising at least one of: (i) a ROM, (ii) an EPROM, (iii) an EAROM, (iv) a flash memory, or (v) an optical disk.

* * * * *